No. 831,554. PATENTED SEPT. 25, 1906.
F. G. HOBART.
BEARING FOR WINDMILL SHAFTS.
APPLICATION FILED DEC. 26, 1905.
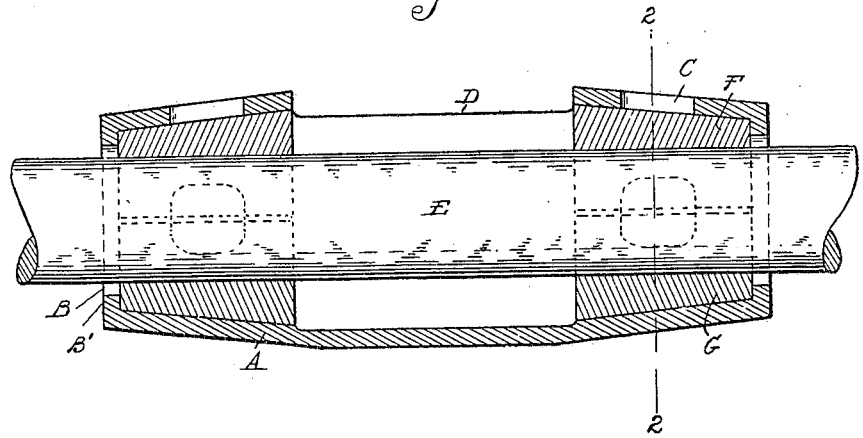
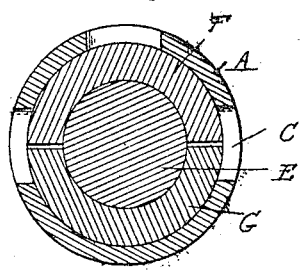
Witnesses
Inventor
Franklin G. Hobart

UNITED STATES PATENT OFFICE.

FRANKLIN G. HOBART, OF BELOIT, WISCONSIN, ASSIGNOR TO FAIRBANKS MORSE & COMPANY, OF CHICAGO, ILLINOIS, A CORPORATION OF ILLINOIS.

BEARING FOR WINDMILL-SHAFTS.

No. 831,554. Specification of Letters Patent. Patented Sept. 25, 1906.

Application filed December 26, 1905. Serial No. 293,280.

*To all whom it may concern:*

Be it known that I, FRANKLIN G. HOBART, a citizen of the United States of America, residing at Beloit, in the county of Rock and State of Wisconsin, have invented certain new useful Improvements in Bearings for Windmill-Shafts, of which the following is a specification, reference being had therein to the accompanying drawings.

My invention relates to new and useful improvements in bearings for windmill-shafts and the like; and it consists in the novel arrangement and construction of parts.

One object of my invention is to provide means for automatically lubricating the bearings, and another object is to arrange for the easy removal and replacement of worn parts in the bearings, as will be more fully hereinafter described, and set forth in the claims.

In the drawings, Figure 1 shows a vertical longitudinal section through the bearings of a windmill-shaft, and Fig. 2 is a cross-section on lines 2 2 on Fig. 1.

A is a hollow casing tapered at its ends and preferably cast integral with the gear-supporting frame of the mill, (not shown;) but, if desired, the casing may be formed separate and secured thereto by bolts or any other suitable means. The ends of the casing have openings B, surrounded by inwardly-extending annular flanges B'. In the top and sides of the casing, near the ends, are openings C, preferably oval in form, and the central portion of the top is open at D.

E is the shaft, passing loosely through the casing through the openings B. The bearings proper for the shaft are formed by complementary bushing members F and G in each end of the casing, and these members are arranged to be inserted in the casing through the opening D while the shaft is in place and to be driven or wedged into the tapered ends of the casing. They are tapered on the outside to fit the interior of the casing and are grooved on their adjacent faces to fit the periphery of the shaft.

These bushings are preferably formed of wood and may be readily removed when desired to be replaced by driving them out, and for this purpose the openings C are formed for the insertion of driving-tools.

Lubricant is poured into the casing through the opening D, and the bushings, becoming saturated therewith, serve to automatically lubricate the shaft. Owing to the size of the casing, sufficient lubricant may be contained to last for a long period.

What I claim as my invention is—

1. In a bearing for windmill-wheel shafts, the combination with a hollow casing tapered at the ends and having openings in the ends and top, of a shaft passing loosely through said end openings and complementary bushing members arranged for insertion between said shaft and casing and tapered for wedging engagement with the ends of said casing, for the purpose described.

2. In a bearing for windmill-shafts, the combination with a hollow casing tapered at the ends and having openings in the ends, in the sides near the ends, and a central opening in the top, of a shaft passing loosely through said end openings, and complementary bushing members adapted to be inserted in the casing through said central opening and to have a wedging engagement with the interior of the tapered portions of said casing, said openings near the ends being arranged for driving out said members.

3. In a bearing for windmill-shafts, the combination with a hollow casing tapered at the ends and having openings in the ends and top, and inwardly-extending annular flanges around said end openings, of a shaft passing loosely through said end openings, and complementary bushing members adapted to be inserted through said top opening and to fit the tapered ends of said casing, the central portion of said casing being adapted to hold lubricant, for the purpose described.

4. In a bearing for windmill-shafts, the combination with a hollow casing having openings in the end and top, of a shaft passing loosely through said end openings and bushings adapted to be inserted in said casing, for the purpose described.

5. In a bearing for windmill-shafts, the combination with a hollow casing having openings in the ends and top, of a shaft passing loosely through said end openings, and complementary bushing members adapted to be inserted in said casing, for the purpose described.

6. In a bearing for windmill-shafts, the combination with a hollow open-ended casing having a central aperture in its top, of a shaft passing loosely through said casing and a bushing adapted to be inserted through said central aperture between said shaft and casing.

In testimony whereof I affix my signature in presence of two witnesses.

FRANKLIN G. HOBART.

Witnesses:
A. E. ASHCRAFT,
A. J. PATCH.